Jan. 22, 1946.    C. J. CRANE    2,393,310
NAVIGATIONAL INSTRUMENT
Filed Feb. 19, 1945
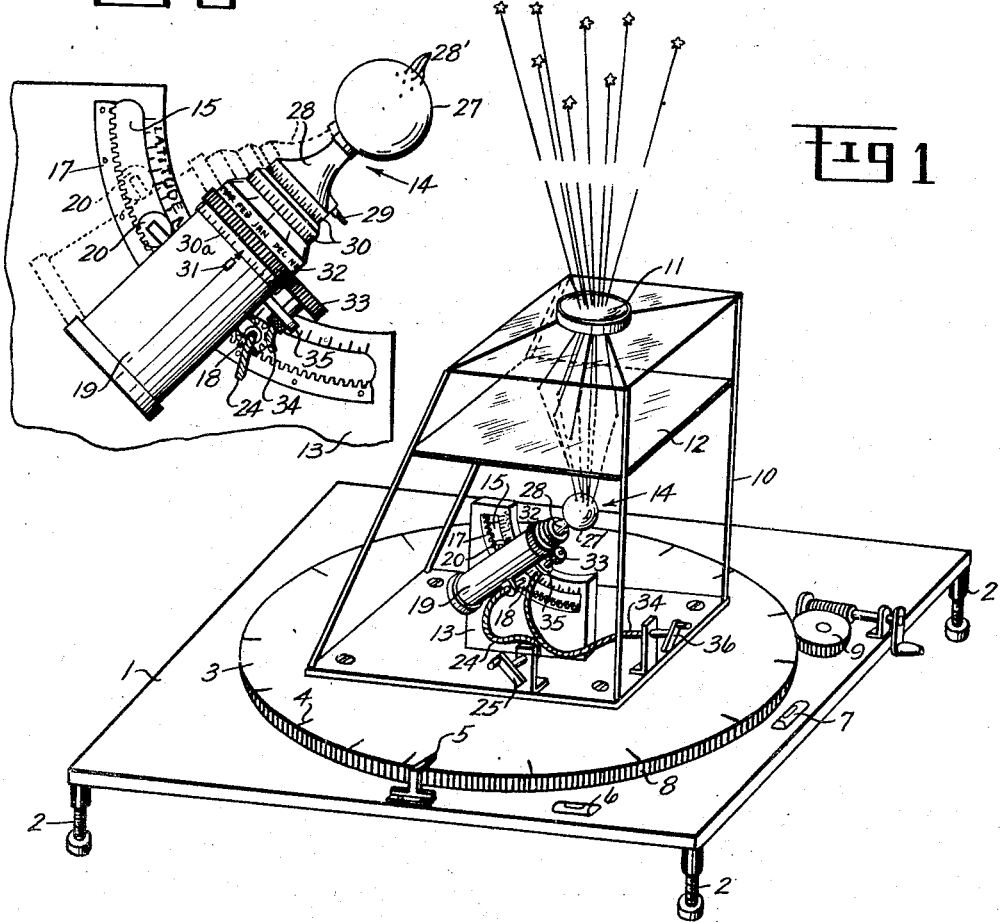
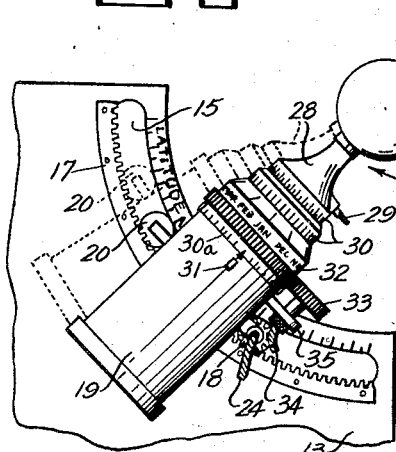
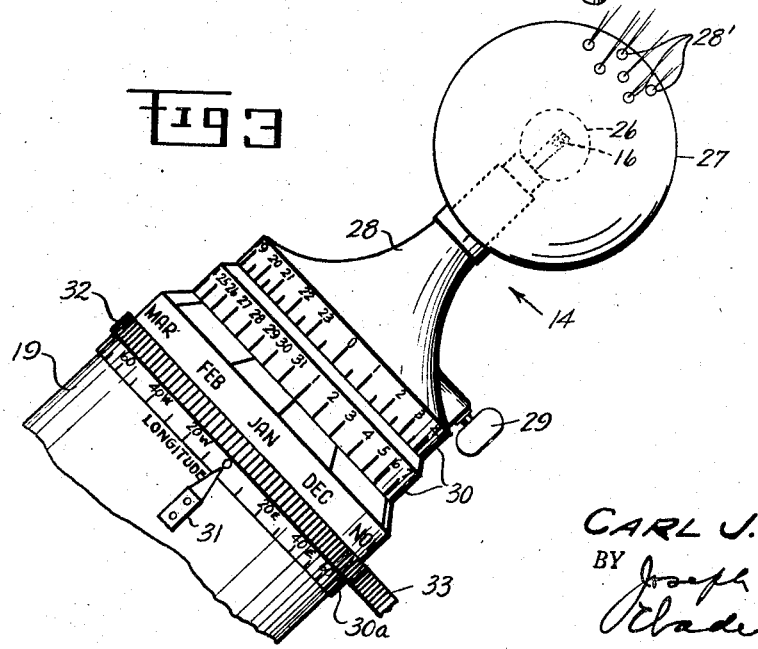
INVENTOR.
CARL J. CRANE
BY
ATTORNEYS Patented Jan. 22, 1946

2,393,310

UNITED STATES PATENT OFFICE 2,393,310

NAVIGATIONAL INSTRUMENT

Carl J. Crane, Sacramento, Calif.

Application February 19, 1945, Serial No. 578,756

8 Claims. (Cl. 88—24)

(Granted under the act of March 3, 1883, as amended April 30, 1928; 370 O. G. 757)

The invention described herein may be manufactured and used by or for Government for governmental purposes, without the payment to me of any royalty thereon.

This invention relates to improvements in navigational instruments, and more particularly, the invention relates to an instrument for accurately locating the latitude and longitude position of an observer using the instrument with respect to predetermined fixed stars or star constellations in the heavens, without the use of mathematical calculations, tables, sextants, and the like, has for one of its objects the employment of simple and easily manipulatable apparatus adapted to project a celestial pattern of actual fixed stars or star constellations in the heavens onto a suitable projection screen and simultaneously projecting a facsimile gnomonic pattern of the aforesaid stars or star constellations onto the same screen in registration with the projected fixed or celestial star pattern including adjusting means for adjusting the position of the facsimile star pattern and simultaneously indicating the latitude and longitude positions at the time period when the facsimile or gnomonic star image pattern that is projected onto the screen will be identical with the projected celestial star image pattern, with the star images thereof positioned for registration with the projected images of the celestial star pattern.

A further object of the invention is the provision of means for adjusting the position of the facsimile star images in the celestial star pattern on the screen with respect to the zenith position on the screen.

A further object is a provision of means for relatively adjusting the celestial pattern around a central point on the projection screen.

A still further object is the provision of an astronomical position-finding instrument having a gnomonic star image projector for projecting a star image pattern onto a translucent screen, including means for rotating the gnomonic star image projecting means about an inclined axis in accordance with sidereal time and means for adjusting position of the gnomonic image projecting means for variations in longitude and latitude locations between the gnomonic star pattern which is projected onto the screen as compared with the celestial star image pattern.

A still further object is the provision of spherical casing having a star image pattern arranged thereon for projecting the stars as they appear in the heavens onto a screen with means for adjusting the casing rotatably on an inclined axis for sidereal time, and separate means for adjusting the angular relation of the rotative axis of the spherical casing for variations in latitude positions of the facsimile star patterns projected on the screen and means for adjusting the rotative position of the casing about said axis for variations in time and longitude positions of the facsimile star image pattern projected onto said screen by said casing.

A further object of the invention is the provision of a rotary support or base carrying the screen and gnomonic projection means having indicia carrying means for orienting the base to orient the gnomonic star image pattern on the image receiving screen with respect to the celestial star image pattern received by the screen.

A still further object is the provision of indicia carrying means for rotating the gnomonic star image projecting means about an adjustably disposed inclined axis for varying the projected star image pattern on the screen for time, longitude position, and for sidereal time as compared to the celestial star image pattern projected onto the screen, including means for adjusting the inclination of the rotary axis of the gnomonic star image pattern projector for variations in latitude positions of the projected facsimile star image pattern, as compared with the actual star images on the screen.

Other objects and advantages of the invention will be apparent from the following description taken in connection with the accompanying drawing in which like reference characters refer to like parts on the several figures.

Fig. 1 is a perspective view disclosing my improved navigational instrument and the mounting thereof on a rotary support.

Fig. 2 is a somewhat enlarged detailed view, in elevation, illustrating my gnomonic projection means and the calibrated adjusting means therefor.

Fig. 3 is an enlarged fragmentary detail view of the projection head for my gnomonic projection means somewhat diagrammatically illustrating the operating means for rotating the head in relation to sidereal time.

Referring more particularly to Figure 1 of the drawing, the reference numeral 1 denotes a supporting base having adjustable standards or legs 2 located at spaced points around the center of the base so that the base member may be adjusted to a horizontal or level position. Rotatably mounted on the upper surface of the base member 1 is a circular or disc-shaped platform 3 having orienting indicia 4 thereon disposed around the periphery thereof adapted to register with an indicating pointer 5 carried on the base 1. The base member 1 is preferably provided with spirit levels 6 and 7 disposed thereon adjacent its adjoining edges so that the leveling of the platform may be facilitated. The circular platform 3 may be provided with a ring gear 8 disposed around the periphery thereof meshing with a crank-driven gear 9 for rotating the platform 3 on the base member 1.

The rotary platform 3 carries a supporting frame member 10, extending upwardly therefrom to support a lens system or member 11 vertically disposed substantially in axial alignment with the rotary axis of the platform. A translucent projection screen member 12 is horizontally carried by the frame 10 intermediate the lens member 11 and the platform 3, at a suitable distance from the lens so that a celestial pattern of the actual stars in the heavens located in an area directly above the lens system around an axis perpendicular to the projection screen and the platform will be projected in focus, on the upper surface of the screen member 12. A rigid supporting standard 13 projects upwardly from the upper surface of the circular platform 3 and carries a facsimile or gnomonic star image pattern projecting means indicated generally at 14. The standard 13 is preferably formed of sheet-like material with a curved slot 15 formed therein having a radius with a center located at a point 16, which is the gnomonic projection center for the facsimile star image pattern to be projected on the opposite or under side of the translucent projection screen member 12. One edge of the slot 15 may be provided with a rack member indicated at 17 and a gear 18 carried by a bracket bearing fixed to the casing 19 for the gnomonic projection device 14 disposed in meshing relation with the rack member 17. A suitably mounted idler gear 20 is carried on a bracket projecting from the opposite side of the casing is disposed in the curved guide slot 15, the gears 18 and 20 maintain the axis of the casing in rigid alignment with the projection center 16 at all times while the inclined axis of the gnomonic projector is shifted. The gear 18 is preferably secured on a shaft driven by a flexible shaft 24 extending to a fixed point on the rotary support 3 with an operating crank or handle member 25.

Operation of the handle member 25 adjusts the casing 19 around the projection point 16 for variations in the latitude position of the navigational instrument. The projection head of the instrument is best seen in Fig. 3 and comprises a concentrated light source or filament 26 located at the point 16, and a spherical casing or shell 27 is carried on the rotary supporting neck portion 28. Suitable rotating means such as a clock work mechanism 29 is provided for rotating the spherical casing or shell 27 on its longitudinal axis in accordance with sidereal time.

The spherical casing or shell 27 is provided with suitably located apertures or openings 28', simulating a facsimile star image pattern of predetermined "fixed" stars or star constellations in the heavens when projected on the translucent screen 12.

The casing 19 is provided with a plurality of indicia carrying rings 30 and 30a indicating time and longitude. The head portion of the device carrying the sidereal clock 29 is rotatably adjustable in the indicia carrying ring 30a, for indicating date and time, and the ring 30a is, in turn, rotatably adjustable on the longitudinal axis of the casing 19, passing through the point 16, for latitude.

If desired, the head carrying the sidereal clock 29 may be adjustable from the outside of the frame 10 as best seen in Fig. 2. The longitude indicating ring 30a being provided with a ring gear 32 meshing with a pinion 33 carried on a flexible shaft 34 which is mounted in a bearing 35 fixed on the casing 19. The opposite end of the flexible shaft is secured outside of the supporting frame 10 and carries an operating handle 36.

In the operation of my improved navigational instrument, the platform 1 is leveled and a celestial star image pattern of the predetermined area around a vertical axis passing through the lens system 11 will be projected onto the upper surface of the translucent horizontally disposed projection screen 12. By manipulating the two operating handles 25 and 36, the gnomonic star image pattern formed by the light rays projected upwardly from the light source 26, through the apertures 28 in the spherical shell 27, may be oriented and adjusted so as to bring the facsimile stars into registration with the celestial star images. If the indicia carrying means 30a and the indicia on the rack 20 are inspected, the latitude and longitude indications thereof will give the exact location of the device, assuming that the head is properly adjusted for the time calculation.

While I have disclosed my invention as employing a simple form of means for leveling the supporting platform, it is within the purview of the invention to employ other leveling means, such as a gyroscope controlled leveling means, and also an orienting means under the control of a gyroscope is contemplated for maintaining the platofrm and gnomonic image projector oriented. Such an arrangement is desirable when the instrument is used in an airplane in flight to maintain the screen and projection means oriented and level.

While I have described my invention in connection with a simple illustrative embodiment it is obvious that various changes and modifications may be made in the construction illustrated without departing from the spirit of the invention as defined by the appended claims.

I claim:

1. In a navigational instrument, a supporting base, an image-receiving screen carried thereby, lens means fixedly associated with said screen for projecting a star image pattern onto said screen from actual stars in the heavens which are located in a predetermined area above said screen, facsimile star image pattern projection means adjustable around a point fixed with respect to said screen for projecting a facsimile star image pattern onto the screen, and means for adjusting said facsimile star image pattern projection means to position said facsimile star image pattern on the screen in registration with said projected pattern on the screen of actual star images, including location determining indicia operatively connected with said adjusting means to position said adjusting means to cause the facsimile star image pattern projected onto the screen to be brought in registration wtih the actual star image pattern on the screen when said location determining indicia is positioned to indicate the time and location when and where the pattern of actual stars in the heavens, above the location, and at the time indicated, will be projected through said lens means onto said screen in locations for registration with the star images in the said projected facsimile star image pattern.

2. In a navigational instrument of the class described, a supporting base, a translucent projection screen horizontally carried thereby, a vertical lens system fixedly located with respect to said supporting base above said projection screen for projecting an actual star image pattern onto the upper surface of said screen from a predetermined area around a vertical axis above said lens system, adjustable facsimile star image pattern projection means fixedly carried with respect to a point on said projection screen for projecting selected facsimile star image patterns of star patterns upwardy from below the translucent projection screen onto the lower surface thereof, means for orienting and adjusting the facsimile image projection means to position the projected facsimile star image pattern on the lower surface of the screen into registration with the actual star image pattern on the upper surface of the screen, including means operatively associated therewith for indicating the location and time when the stars of the image projected by said lens system on the screen will be relatively positioned in the heavens in said area around said vertical axis passing through the lens system so that the projected images thereof will be positioned on the screen for registration with said projected facsimile star image pattern, at the time and place indicated by the indicating means for the adjusting means.

3. In a navigational instrument of the class described, a rotary support adapted to be leveled, a projection screen carried by said support, lens means carried by the support and arranged to project a star image pattern of stars in the heavens which are located in a predetermined area above said support around a vertical axis passing through said lens means and the rotary center of the support onto said screen, facsimile star image pattern projection means for projecting selected facsimile star image patterns of predetermined star images onto the screen from a point fixed with respect to the said vertical axis, position and time indicating means for adjusting the position of said projection means about said point to dispose the facsimile star image pattern on the screen in registration with the actual star image pattern projected onto the screen by said lens means, when the star images projected onto the screen are from actual stars in the heavens which are located in said area around said vertical axis passing through the said lens means and the rotary center of the support.

4. In a navigational instrument, a base support adapted to be leveled, having a translucent projection screen carried thereby, lens means fixedly carried on the support for projecting onto said screen an image of stars in the heavens located within a predetermined area around an axis passing through said base support perpendicular to the base support, facsimile star image projection means carried by said base support for projecting onto said screen predetermined facsimile star pattern images of selected stars in the heavens from a point fixed with respect to said screen and support, and position and time determining means for adjusting said facsimile star image pattern projection means to adjust the image projected therefrom into registration with the projected actual star pattern from the stars in the heavens, projected onto the screen through the lens means, including means to indicate the location of the base support at the time when the projected actual star pattern will be positioned on the screen for registration with the indicated location of the facsimile star pattern.

5. In a navigational instrument, a portable translucent viewing screen, means for leveling the viewing screen and for orienting the screen, lens means fixedly disposed above the screen for projecting a star image pattern of actual stars in the heavens, which are located in a predetermined area around a vertical axis passing through the lens means and the central portion of the screen, onto the upper surface of the screen, facsimile star image pattern projection means adjustable relatively about a point fixed with respect to said lens means and screen, on said vertical axis, for projecting onto the lower surface of the screen, facsimile star image patterns of the actual stars in the zenith at different locations of the screen, at predetermined time periods, and location indicating means operatively connected to said facsimile star image pattern projection means for adjusting the projected facsimile star image pattern into registration with the star image pattern of the actual star in the heavens, having means for indicating the time, and location of the screen, when the stars in the actual star image pattern on the screen and the same stars in the facsimile star image pattern on the screen will be in registration with each other.

6. In a navigational instrument, a plane supporting surface, means for leveling the supporting surface, a rotary support horizontally carried by said plane supporting surface to rotate around a vertical axis, means for orienting said rotary supporting surface about said vertical axis, a projection screen horizontally carried on said rotary supporting surface, lens means carried on said rotary supporting surface in fixed relation to said screen for projecting a celestial star image pattern of stars in the zenith onto said screen, gnomonic facsimile star image pattern projection means adjustably carried on said rotary supporting support to project star image patterns onto the screen from a point fixed with respect to the screen, means for rotating said gnomonic projection means around said fixed point for sidereal time, means for adjusting said gnomonic projection means in the same direction to vary the rotative position of the gnomonic star pattern on the screen to compensate for variations in its location, as to longitude and time, means for adjusting the position of said gnomonic star image projection means in a vertical plane for variations in latitude, whereby the gnomonic star pattern image is adapted to be brought into register with the celestial star image pattern and said adjusting means is adapted to indicate the time, longitude and latitude position of the supporting surface at the time and location indicated, when and where said gnomonic star image pattern projected onto the screen will be disposed for registration with said celestial star image pattern of the stars in the heavens projected onto the screen through said lens means at the time and location indicated.

7. In a navigational instrument, a support, gnomonic projection means carried thereby for projecting facsimile star image patterns from a point fixed with respect to said support, an image-receiving translucent screen horizontally carried above said gnomonic projection means to receive the star image patterns projected therefrom, a lens system fixedly disposed directly above said fixed point at the opposite side of said screen, in spaced relation to the surface of the screen to project a celestial star image pattern of the stars in the zenith above the screen upon said screen in registration with said facsimile star image pattern, means for rotating said gnomonic projection means around an adjustably-inclined axis for sidereal time, means for adjusting said gnomonic projection means around said axis for variations in time and longitude, and means for adjusting the inclination of said inclined gnomonic projector axis to adjust the position of the star images of the gnomonic star image pattern for variations in the latitude location of the instrument, to cause registration of the gnomonic star image pattern on the screen with the projected celestial star image pattern, at the time, latitude, and longitude indicated by said adjusting means for the gnomonic projector.

8. In a navigational instrument, a supporting platform, means for leveling the platform, a rotary supporting platform carried thereby adapted to rotate about a center fixed substantially centrally of said platform, a support projecting upwardly from said rotary platform, translucent projection screen means horizontally carried by said support in spaced parallel relation to said supporting platform above the same, vertical lens means fixedly carried by said rotary platform above the same and projecting upwardly toward the zenith, an adjustably-inclined rotary support carried by said platform below said screen, having gnomonic star image projection means with a fixed light source, a facsimile star image projecting casing surrounding said light source, means for rotating said casing on the inclined axis, means for rotating said casing in accordance with sidereal time, means for adjusting the rotative position of the casing on said axis to adjust the projected position of the stars on the screen for variations in time and longitude, between the projected gnomonic star image on the screen and the projected celestial star image pattern on the screen, and means for adjusting the inclination of the rotary axis of the gnomonic star pattern projecting casing for variations in latitude between the locations on the screen, of the projected stars in the facsimile star image pattern from the gnomonic projection means, and the locations on the screen of the stars in the projected celestial star image pattern.

CARL J. CRANE.